United States Patent
Ogorodnikov et al.

(10) Patent No.: US 12,235,608 B2
(45) Date of Patent: Feb. 25, 2025

(54) SMART VEHICLE HOLOGRAMS

(71) Applicant: Ford Global Technologies, LLC, Dearborn, MI (US)

(72) Inventors: Dmitry Ogorodnikov, Amherstburg (CA); Steven Chapekis, Escanaba, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 18/173,194

(22) Filed: Feb. 23, 2023

(65) Prior Publication Data
US 2024/0288823 A1  Aug. 29, 2024

(51) Int. Cl.
| | |
|---|---|
| G03H 1/00 | (2006.01) |
| B60R 1/22 | (2022.01) |
| H04N 5/89 | (2006.01) |

(52) U.S. Cl.
CPC .......... *G03H 1/0005* (2013.01); *B60R 1/22* (2022.01); *H04N 5/89* (2013.01); *B60R 2300/20* (2013.01); *G03H 2001/0088* (2013.01); *G03H 2227/03* (2013.01)

(58) Field of Classification Search
CPC ......... G03H 1/0005; G03H 2001/0088; G03H 2227/03; G03H 2001/0413; G03H 2227/02; B60R 1/22; B60R 2300/20; H04N 5/89
USPC .......................................................... 348/40
See application file for complete search history.

(56) References Cited

U.S. PATENT DOCUMENTS

| | | | |
|---|---|---|---|
| 8,289,598 B2 * | 10/2012 | Shirakura | G03H 1/268 |
| | | | 359/10 |
| 8,739,019 B1 * | 5/2014 | Nevins | G06F 3/013 |
| | | | 715/785 |
| 10,742,967 B2 | 8/2020 | Hoggarth et al. | |
| 11,122,256 B1 * | 9/2021 | Topliss | G02B 27/0172 |
| 11,787,288 B2 * | 10/2023 | Johnson | G06F 3/013 |
| | | | 345/1.1 |

(Continued)

FOREIGN PATENT DOCUMENTS

| | | |
|---|---|---|
| CN | 112764219 A | 5/2019 |
| CN | 109720277 A | 5/2021 |

OTHER PUBLICATIONS

J. Skirnewskaja "Automotive Holographic Head-Up Displays" (Feb. 2022).

(Continued)

*Primary Examiner* — Christopher S Kelley
*Assistant Examiner* — Asmamaw G Tarko
(74) *Attorney, Agent, or Firm* — Emily Drake; Eversheds Sutherland (US) LLP (57) ABSTRACT

A vehicle for projecting holograms is described. The vehicle may include a plurality of Integrated Holographic Camera Modules (IHCMs) configured to project movable holograms. The vehicle may further include a vehicle processor communicatively coupled to the plurality of IHCMs. The vehicle processor may obtain a recording of a movable hologram from a first IHCM and determine a hologram movement from the recording. The vehicle processor may further switch a projection of the movable hologram from the first IHCM to a second IHCM when a predefined criterion is met. The vehicle processor may determine that the predefined criterion is met when the projection moves from a first IHCM projection range to a second IHCM projection range.

13 Claims, 7 Drawing Sheets

(56) References Cited

U.S. PATENT DOCUMENTS

| | | | | |
|---|---|---|---|---|
| 2010/0157063 | A1* | 6/2010 | Basso | G09F 27/00 |
| | | | | 348/169 |
| 2011/0115990 | A1* | 5/2011 | Bhaktiar | B60R 11/0235 |
| | | | | 348/836 |
| 2012/0170089 | A1* | 7/2012 | Kim | G06F 1/1647 |
| | | | | 359/9 |
| 2014/0065520 | A1* | 3/2014 | Tsang | G03H 1/02 |
| | | | | 359/9 |
| 2014/0240378 | A1* | 8/2014 | Fujioka | G09G 5/10 |
| | | | | 345/690 |
| 2016/0209647 | A1* | 7/2016 | Fürsich | G02B 27/0075 |
| 2017/0352185 | A1* | 12/2017 | Bonilla Acevedo | B60J 1/20 |
| 2019/0011621 | A1* | 1/2019 | Karafin | G02B 27/0955 |
| 2019/0033781 | A1* | 1/2019 | Johnson | G03H 1/0011 |
| 2019/0113829 | A1* | 4/2019 | Waldern | G06F 3/013 |
| 2019/0126824 | A1* | 5/2019 | Oba | E05F 15/70 |
| 2020/0183328 | A1 | 6/2020 | Studeny et al. | |
| 2020/0225813 | A1* | 7/2020 | Schwarz | G06F 3/017 |
| 2020/0290513 | A1* | 9/2020 | Karafin | G06F 3/017 |
| 2020/0309944 | A1* | 10/2020 | Thoresen | G06T 19/006 |
| 2020/0371472 | A1* | 11/2020 | Karafin | G02B 30/56 |
| 2020/0387931 | A1* | 12/2020 | Bastiyali | G09F 19/02 |
| 2020/0387932 | A1* | 12/2020 | Bastiyali | G09F 19/18 |
| 2021/0092335 | A1* | 3/2021 | Cramer | G03B 21/625 |
| 2021/0195732 | A1* | 6/2021 | Longinotti-Buitoni | |
| | | | | H05K 3/361 |
| 2021/0224525 | A1* | 7/2021 | Zhang | G06V 40/28 |
| 2021/0307650 | A1* | 10/2021 | Barr | A61B 5/1121 |
| 2023/0302374 | A1* | 9/2023 | Deuel | B60L 53/16 |
| 2023/0308605 | A1* | 9/2023 | Ritchey | H04N 21/4305 |
| 2024/0092369 | A1* | 3/2024 | Agrawal | B60W 40/09 |

OTHER PUBLICATIONS

T. Stone "Wayray Aims To Replace Car Dashboards With Holographic Displays" (Sep. 2021).

* cited by examiner

SMART VEHICLE HOLOGRAMS

TECHNICAL FIELD

The present disclosure relates to smart vehicle holograms, and more particularly, to a system and method for projecting moveable and interactive holograms inside and outside of a vehicle.

BACKGROUND

Holography is a known technique that enables recording of images of an object and reconstructing two-dimensional (2D) or three-dimensional (3D) holograms from the recorded images. Such techniques are widely used in various industries such as healthcare, education, designing, automotive, etc. Specifically in the automotive industry, some vehicles include holographic head up displays (HUDs) that enable users to perform various vehicle actions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle configured to project holograms outside or inside the vehicle. The vehicle may include a plurality of Integrated Holographic Camera Modules (IHCMs) that may project movable and interactive holograms. The holograms may be of objects, animals, human beings, and the like. In an exemplary aspect, the vehicle may project a movable hologram that may move around the vehicle. The vehicle may include a processor that may control hologram projections from the plurality of IHCMs, such that the hologram may move around the vehicle without any noticeable visual distortion or interference. Specifically, the processor may seamlessly switch movable hologram projection from a first IHCM to a second IHCM, when the movable hologram moves from a first IHCM projection range to a second IHCM projection range.

In some aspects, the vehicle may include a set of interior IHCMs and a set of exterior IHCMs that may enable the vehicle to project holograms inside and outside the vehicle. The vehicle may additionally combine or merge hologram projections from the interior and exterior IHCMs to project a unified and large hologram, which may include a hologram part that may be inside the vehicle and another hologram part that may be outside the vehicle.

The vehicle may be further configured to project holograms on two-dimensional (2D), three-dimensional (3D) screens, monitors inside or outside the vehicle, vehicle windows, etc., by using the interior and exterior IHCMs. For example, the vehicle may project a restaurant menu, a movie schedule, etc. on the vehicle windows by using the interior IHCMs. The vehicle may further determine user interactions with the projected holograms and perform an action(s) based on the user interactions. For example, the vehicle may project police officer or security guard holograms outside the vehicle, and may send a notification to a vehicle user when someone tries to touch the holograms or passes through the holograms.

The present disclosure discloses a vehicle that may project movable and interactive holograms. The projected holograms may be used for security purposes, for example, to guard the vehicle or a user home. Further, the vehicle may raise an alarm when someone tries to trespass the holograms, thus securing the vehicle and/or the user home. Furthermore, the vehicle may project holograms that may add to user convenience in day-to-day activities. For example, the user can place orders in a restaurant or select movies to watch conveniently, by interacting with holograms that may be projected on the vehicle windows.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
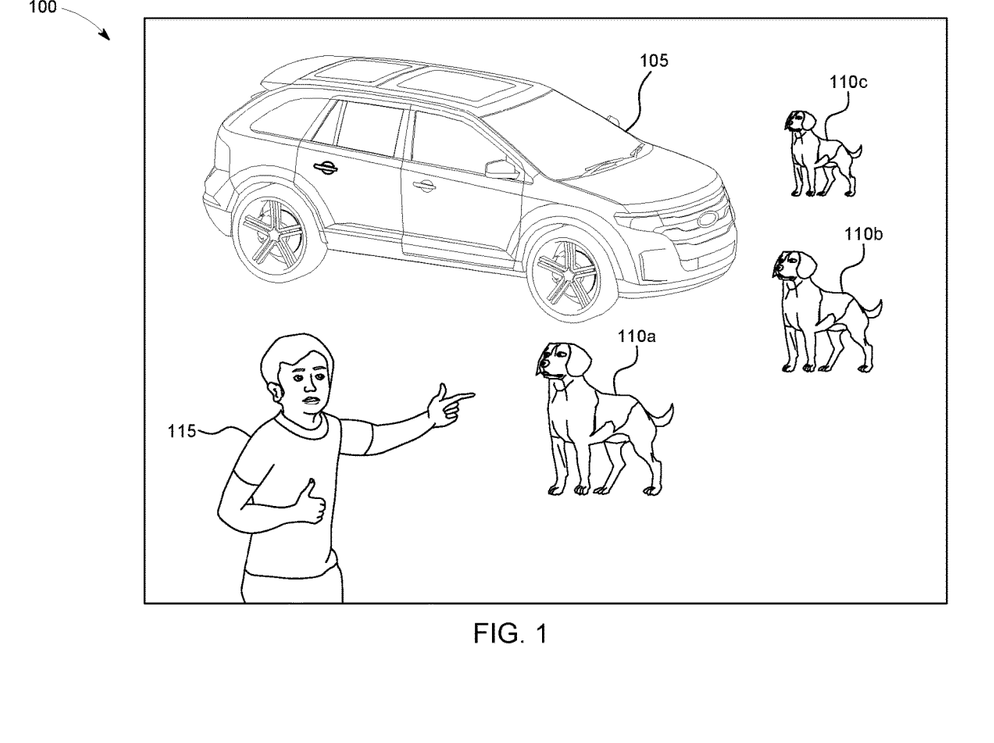
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 105, which may take the form of any passenger or commercial vehicle such as, for example, a car, a work vehicle, a crossover vehicle, a van, a minivan, a taxi, a bus, etc. The vehicle 105 may be a manually driven vehicle, and/or may be configured to operate in a fully autonomous (e.g., driverless) mode or a partially autonomous mode. Further, the vehicle 105 may include any powertrain such as, for example, a gasoline engine, one or more electrically-actuated motor(s), a hybrid system, etc.

The vehicle 105 may include a plurality of Integrated Holographic Camera Modules (IHCMs, not shown in FIG. 1) that may be configured to project holograms of an object inside or outside the vehicle 105. Each IHCM may include a plurality of components/units including, but not limited to, a holographic projector, a holographic recorder, a video camera, a control unit or a processor and the like, that may enable the IHCM to project holograms. The component details of an IHCM are described in conjunction with FIG. 2.

The vehicle 105 may include a first set of exterior IHCMs and a second set of interior IHCMs. The first set of exterior IHCMs may be configured to project holograms 110a, 110b, 110c (collectively referred as holograms 110) outside the vehicle 105. The second set of interior IHCMs may be configured to project holograms (not shown) inside the vehicle 105. In some aspects, the first set of exterior IHCMs and the second set of interior IHCMs may be configured to project static as well as movable holograms 110.

The holograms 110 may be two-dimensional (2D) or three-dimensional (3D) images of human beings, objects, animals, etc. For example, the holograms 110 may be 2D or 3D images of outdoor post lanterns, light candles, flowers, lights, displays, robots, equipment, animals, birds, cartoon characters, creative non-realistic content, vehicle passengers, fictitious people, famous people, celebrities, and/or the like. The interior IHCMs may project same or different holograms as the holograms that the exterior IHCMs may project.

In some aspects, the plurality of IHCMs may be configured to rotate automatically to project movable holograms 110. In particular, the plurality of IHCMs may include a rotating mechanism (such as actuators and gears) that may enable the plurality of IHCMs to rotate and project movable holograms 110. In addition, the plurality of IHCMs may include electromagnetic plates to adjust IHCM camera focal length and/or to perform autofocus.

In some aspects, the first set of exterior IHCMs may project the holograms 110 that may move around the vehicle 105. For example, a third IHCM of the first set of exterior IHCMs may project the hologram 110a at a first position. The third IHCM may rotate automatically and move the hologram 110a from the first position to a second position (e.g., at a location where the hologram 110b is shown in FIG. 1). In some aspects, the second position may be a location around the vehicle 105 where a third IHCM projection range may end and a projection range of a fourth IHCM may begin. In this case, a vehicle 105 processor (not shown) may switch or handover hologram 110a projection from the third IHCM to the fourth IHCM.

Responsive to the switch, the fourth IHCM may project the hologram 110b (which may be same as the hologram 110a), and may rotate to move the hologram 110b from the second position to a third position (e.g., at a location where the hologram 110c is shown in FIG. 1). The third position may be a location around the vehicle 105 where a fourth IHCM projection range may end and a projection range of a fifth IHCM projection range may begin. In this case, the vehicle 105 processor may switch hologram 110b projection from the fourth IHCM to the fifth IHCM, which may project the hologram 110c.

In this manner, the first set of exterior IHCMs may move/spin the hologram 110 around the vehicle 105, without any noticeable visual deviations or interruption during hologram 110 movement around the vehicle 105. The details of hologram movement around the vehicle 105 may be understood in conjunction with FIG. 4.

In further aspects, the vehicle 105 processor may be configured to merge projections from the first set of exterior IHCMs and the second set of interior IHCMs to form a unified large hologram. As an example, the vehicle 105 processor may form a hologram of a big polar bear (by merging projections from the interior and exterior IHCMs) that may be projected as driving the vehicle 105, such that a part of bear body may be inside the vehicle 105 and a bear head may be outside the vehicle (e.g., protruding from a vehicle 105 top portion).

In some aspects, the plurality of IHCMs may be configured to perform predefined actions responsive to receiving user inputs associated with the hologram 110. For example, the plurality of IHCMs may record the hologram 110 movement (e.g., as a high definition video) based on a user hand gesture, e.g., when a user 115 gives a "thumbs up" and points towards the hologram 110. In this case, the vehicle 105 processor may identify the user hand gesture and use a lookup table (that may be stored in a vehicle memory) to determine the action (e.g., recording of hologram 110) that the IHCMs may need to perform corresponding with the identified hand gesture.

In some aspects, the vehicle 105 processor may authenticate the user 115 before commanding the IHCMs to record the hologram 110 movement. The vehicle 105 processor may authenticate the user 115 via vehicle facial recognition feature/technology. Upon successful authentication, the vehicle 105 processor may command the IHCMs to record the hologram 110 movement. The vehicle 105 processor may be further configured to transmit the recordings (e.g., holographic scan files) to a server (not shown in FIG. 1) for further processing and customization. Processing and customization of holograms are described in conjunction with FIG. 2.

The plurality of IHCMs may be configured to project holograms 110 when the vehicle 105 is stationary or in motion. Further, the IHCMs may project different holograms simultaneously. Furthermore, the IHCMs may project some holograms in a vehicle 105 plane, and may project some holograms over and below the vehicle 105. Examples of hologram projections may be understood in conjunction with FIG. 3.

The plurality of IHCMs may have utility in various applications, including civilian and military applications. For example, the IHCMs may be used for vehicle navigation (including turn signals), indicating vehicle status, video call, video sharing, displaying signs, security surveillance, 3D lighting, displaying vehicle holographic entertainment information, upgrading vehicle virtual body, assisting valet parking, aerial taxi navigation, kids entertainment, virtual auto pilot, parking maneuvers, and/or the like. In addition, the IHCMs may be used in military applications such as for armed forces replications, military indications, tactical enemy trap projections, vehicle transformation, wall barriers, chameleon camouflage, virtual training programs, and/or the like.

Figure 2:
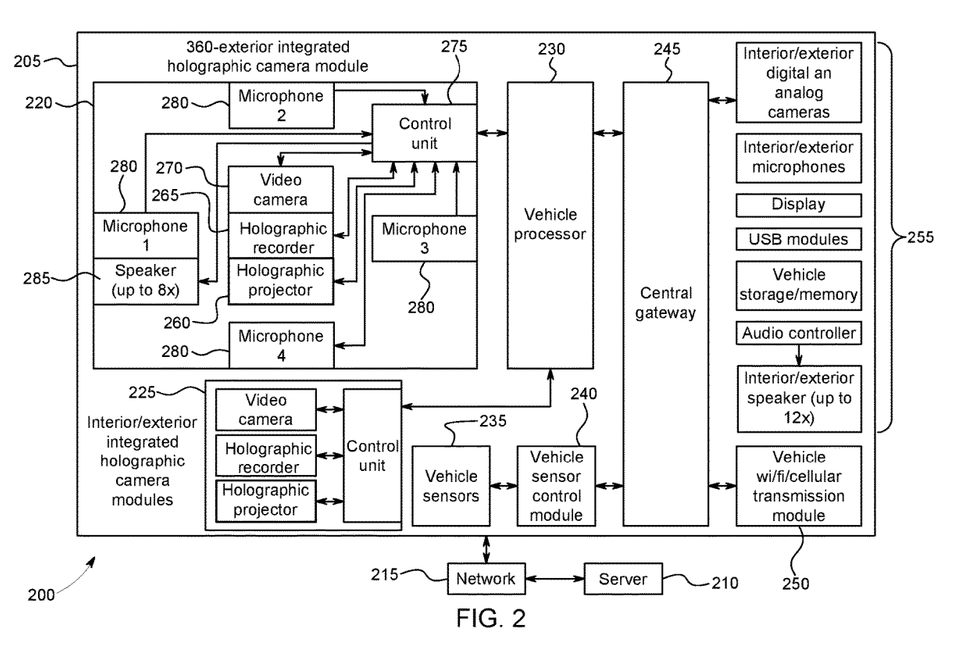
FIG. 2 illustrates a block diagram of a system for projecting holograms in accordance with the present disclosure.

FIG. 2 illustrates a block diagram of a system 200 for projecting holograms 110 in accordance with the present disclosure. The system 200 may include a vehicle 205 and a server 210, which may be connected via a network 215. The vehicle 205 may be same as the vehicle 105.

The network 215 illustrate an example communication infrastructure in which the connected devices discussed in various embodiments of this disclosure may communicate. The network 215 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The server 210 may be part of a cloud-based computing infrastructure, and may be associated with and/or include a Telematics Service Delivery Network (SDN) that provides digital data services to the vehicle 205 and other vehicles (not shown in FIG. 2) that may be part of a vehicle fleet.

In some aspects, the vehicle 205 may include a 360-degree exterior IHCM 220, a plurality of IHCMs 225 (same as the plurality of IHCMs described in FIG. 1), a vehicle processor 230, vehicle sensors 235, a vehicle sensor control module 240, a central gateway 245, a vehicle Wi-Fi/Cellular transmission module 250, and a plurality of additional components 255. The additional components 255 may include, but are not limited to, interior/exterior digital and analog cameras, interior/exterior microphones, displays, USB modules, a vehicle storage/memory, an audio controller, interior/exterior speakers, and/or the like.

The vehicle 205 components/units described above may be communicatively connected with each other via the central gateway 245.

The 360-degree exterior IHCM 220 may be disposed on a vehicle top and/or a vehicle bottom portion. The 360-degree exterior IHCM 220 may include various components including, but not limited to, a 360-degree holographic projector 260, a holographic recorder 265, a 360-degree video camera 270, a control unit 275, one or more microphones 280, a speaker 285 etc., which may be present in a single hardware.

The 360-degree holographic projector 260 may be configured to project holograms (described in conjunction with FIG. 1), 3D scenes, models, etc. In some aspects, the 360-degree holographic projector 260 may use laser beam with image reflection technology for projecting the holograms 110. The holographic recorder 265 may be configured to collect/gather detailed 3D information by illuminating a scene (as an example) with infrared or near infrared light and measuring the distance between the holographic recorder 265 and objects within that scene. Thus, the holographic recorder 265 may be configured to scan/record 2D/3D objects/scenes/models. In addition, the holographic recorder 265 may be configured to generate Graphics Language Transmission Format (glTF) file that may be displayed by using the holographic projectors (such as the holographic projector 260). The holographic recorder 265 may further share the glTF file with the vehicle processor 230 and store the glTF file in the vehicle memory or the server 210. In some aspects, the holographic recorder 265 may include a time-of-flight (or TOF sensor).

The 360-degree video camera 270 may be configured to capture videos or images in vicinity of the 360-degree exterior IHCM 220. In some aspects, the 360-degree video camera 270 may be a digital camera. The 360-degree video camera 270 may be configured to record holograms 110 movement videos. The one or more microphones 280 may be used for spatial (3D) sound recording and the speaker 285 may be used for audio output. In some aspects, the 360-degree video camera 270 may use audio inputs from the microphones 280, while recording holograms 110 movement videos.

The control unit 275 may communicatively couple with the 360-degree exterior IHCM 220 components described above, and may control IHCM component operation\. In some aspects, the control unit 275 may communicatively couple with the vehicle processor 230. The control unit 275 may transmit information, files, etc. (e.g., glTF files) from the 360-degree exterior IHCM 220 to the vehicle processor 230, and may receive instructions (e.g., hologram 110 movement video recording command) from the vehicle processor 230.

Each IHCM 225 may include holographic projectors, holographic recorders, video cameras, and control units, as described above. Each IHCM 225 may be disposed on a vehicle front side, a backside, a left side and/or a right side. The video cameras and the holographic projectors included in each IHCM 225 may be 180-degree Cameras and projectors, respectively. The control units of each IHCM may communicatively couple with respective holographic projectors, holographic recorders, and video cameras, and the vehicle processor 230.

The plurality of IHCMs 225 may be located in vehicle exterior and vehicle interior portions. The plurality of IHCMs 225 may include the first set of exterior IHCMs and the second set of interior IHCMs (as described above in conjunction with FIG. 1). The first set of exterior IHCMs may be located on vehicle exterior portion. For example, the first set of exterior IHCMs may be located on four vehicle side surfaces. The second set of interior IHCMs may be located anywhere inside the vehicle 105, e.g., near rain sensors or in vicinity of a vehicle dash camera area.

In some aspects, the 360-degree exterior IHCM 220 and the plurality of IHCMs 225 may project holograms (e.g., the holograms 110) inside and around the vehicle 205. In other aspects, the 360-degree exterior IHCM 220 and the plurality of IHCMs 225 may project holographic content/object on either side of vehicle windows, and/or on vehicle bottom or top surfaces where transparent and tinted materials such as glass, acrylic, plastic and polycarbonates (polyester) may be disposed. Specifically, the IHCMs 220, 225 may project the holographic content/object on projection surfaces/screens, e.g., the vehicle windows. In this case, the vehicle windows (or window glass panels) may include transparent projection films that may transform the vehicle windows into projection surfaces/screens. In an exemplary aspect, a total thickness of the transparent projection film on a vehicle window may be less than 120 micrometer. The transparent projection film may be flame retardant and polarized with an ability to block ultraviolet rays (i.e., include UV shield) and gather light. In particular, the holographic content projected onto the vehicle window, embedded with the transparent projection film as described herein, may generate/create visual 3D and 2D effects on the vehicle window surface.

The vehicle processor 230 may communicatively couple with the 360-degree exterior IHCM 220 and the plurality of IHCMs 225 via respective control units, as described above. The vehicle processor 230 may be an Artificial Intelligence (AI)-based system/unit that may include a neural network model (not shown). The neural network model may be a trained or unsupervised neural network model that may analyze the scanned information/files/data received from the 360-degree exterior IHCM 220 and the plurality of IHCMs 225 by using machine learning and image processing.

In one or more aspects, the neural network model may include electronic data, which may be implemented, for example, as a software component, and may rely on code databases, libraries, scripts, or other logic or instructions for execution of a hologram projection and management algorithm by the vehicle processor 230. The neural network model may be implemented as code and routines configured to enable a computing device, such as the vehicle processor 230, to perform one or more operations. In some aspects, the neural network model may be implemented using hardware including a processor, a microprocessor, a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

In particular, the vehicle processor 230 may process the holographic recording (e.g., the hologram 110 recording received from the holographic recorder 265 as glTF files) by using the neural network model described above. More particularly, the vehicle processor 230 may perform processing (including video and audio processing), analysis, conversion, optimization, censorship, customization of the recordings/files/data shared by the 360-degree exterior IHCM 220 and the plurality of IHCMs 225. The vehicle processor 230 may receive, via the control unit 275 and/or respective control units associated with the IHCMs 225, videos or images from the video cameras (e.g., the video camera 270), recordings from the holographic recorders (e.g., the holographic recorder 265) or audio inputs from microphones (e.g., the microphones 280). Responsive to receiving the data (e.g., the videos/images/recordings/audio input), the vehicle processor 230 may supplement the received data with additional information or may perform one or more predefined actions based on the data.

For example, the vehicle processor 230 may perform one or more of: animate or inanimate the received data, perform facial and gesture recognition (as described in conjunction with FIG. 1) of real objects (e.g., the user 115) and holograms 110, movement tracking of real objects and holograms 110, position prediction of real objects and holograms 110, distance measurement of real objects and holograms 110, projection position calibration of real objects and holograms 110, touch surface event tracking of holograms 110 (e.g., determining whether someone tries to touch a hologram), color/shape/pattern change recognition of holograms 110, determination of malfunctioning of a holographic projector, and/or the like.

Responsive to performing one or more actions as described above, the vehicle processor 230 may transmit instructions or commands to one or more vehicle 205 units/components. For example, the vehicle processor 230 may command the 360-degree exterior IHCM 220 and/or the plurality of IHCMs 225 to record a high-definition video of the hologram 110 movement, when the vehicle processor 230 detects a user 115 "thumbs up", as described in conjunction with FIG. 1. Further, the vehicle processor 230 may change hologram 110 color, dimensions, design, etc., based on user 115 inputs (e.g., based on user 115 gesture or instructions received via a user device or a vehicle 205 Human Machine Interface (HMI)). The vehicle processor 230 may further transmit the recorded high-definition video or the glTF files to the server 210 or a user device (not shown), via the vehicle Wi-Fi/Cellular transmission module 250 and the network 215. As another example, the vehicle processor 230 may send a notification to the user device and/or the server 210 when the vehicle processor 230 detects that someone has tried to touch a hologram.

Although the description above relates to an aspect in which the vehicle processor 230 performs the one or more actions, in some aspects, the server 210 may perform some or all of the actions described above. In this case, the vehicle processor 230 may send the data received from the 360-degree exterior IHCM 220 and/or the plurality of IHCMs 225 to the server 210, via the vehicle Wi-Fi/Cellular transmission module 250 and the network 215. Responsive to receiving the data, the server 210 may process (including video and audio processing), analyze, convert, optimize, perform censorship and/or customize the received data, as described above. In this case, the server 210 may also include the neural network model.

In some aspects, the server 210 may further couple with additional servers or databases (not shown in FIG. 2). For example, the server 210 may couple with third-party servers, other vehicle holographic projectors, smart home devices, voice assistant controllers, robots, etc., via the network 215, to add further features or supplemental information or animation to the holograms 110.

In additional aspects, the server 210 may include a list of pre-stored images (e.g., sample images) of objects/scenes/models. A vehicle 205 operator (e.g., the user 115) may access the server 210, via the user device or the vehicle 205 HMI (not shown), and select an image to generate the holograms 110. For example, the user 115 may select an image of a dog, and send a request to the server 210 to generate a dog hologram. Responsive to receiving the request, the server 210 may send the hologram generation request and the selected dog image to the vehicle processor 230, which may in turn send the hologram generation request and the selected dog image to the 360-degree exterior IHCM 220 and/or the plurality of IHCMs 225. Responsive to receiving the request, the IHCMs may generate the hologram 110.

The vehicle processor 230 may send the hologram generation request to the 360-degree exterior IHCM 220 when the user 115 indicates (via the hologram generation request) that the generated hologram needs to be projected at the vehicle top or bottom side. On the other hand, the vehicle processor 230 may send the hologram generation request to the plurality of IHCMs 225 when the user 115 indicates that the generated hologram needs to be projected in vicinity of vehicle side surfaces, and/or vehicle front/back surface.

In some aspects, the list of pre-stored images may be present in the vehicle memory (in addition to or instead of the server 210), and the user 115 may select the image (e.g., the dog image) from the vehicle memory.

In further aspects, the vehicle processor 230 may communicatively couple with the vehicle sensors 235, via the vehicle sensor control module 240. The vehicle sensors 235 may include sensors including, but not limited to, vehicle motion sensors, vehicle light sensors, and/or the like. In some aspects, the vehicle light sensor may be configured to detect ambient light (i.e. detect day/night time), and transmit the detection to the vehicle processor 230. The vehicle processor 230 may receive the inputs (e.g., detection information) from the vehicle light sensors, and may actuate a vehicle screen blind via actuators when the holograms are being projected on the vehicle windows (or other vehicle screens). In particular, the vehicle processor 230 may raise or lower the vehicle screen blind on the vehicle windows based on whether the detected ambient light is dark or bright.

In some aspects, the vehicle screen blind as described above may be a transparent polyester screen blind. A person ordinarily skilled in the art may appreciate that the polyester screen blind may absorb unwanted stray ambient light, and may be used for both interior and exterior holographic projections. The polyester screen blind may include a black color fabric, a white color fabric or a grey color fabric. Based on holographic projection requirements, a vehicle operator (e.g., the user 115) may select the screen blind fabric.

Figure 3:
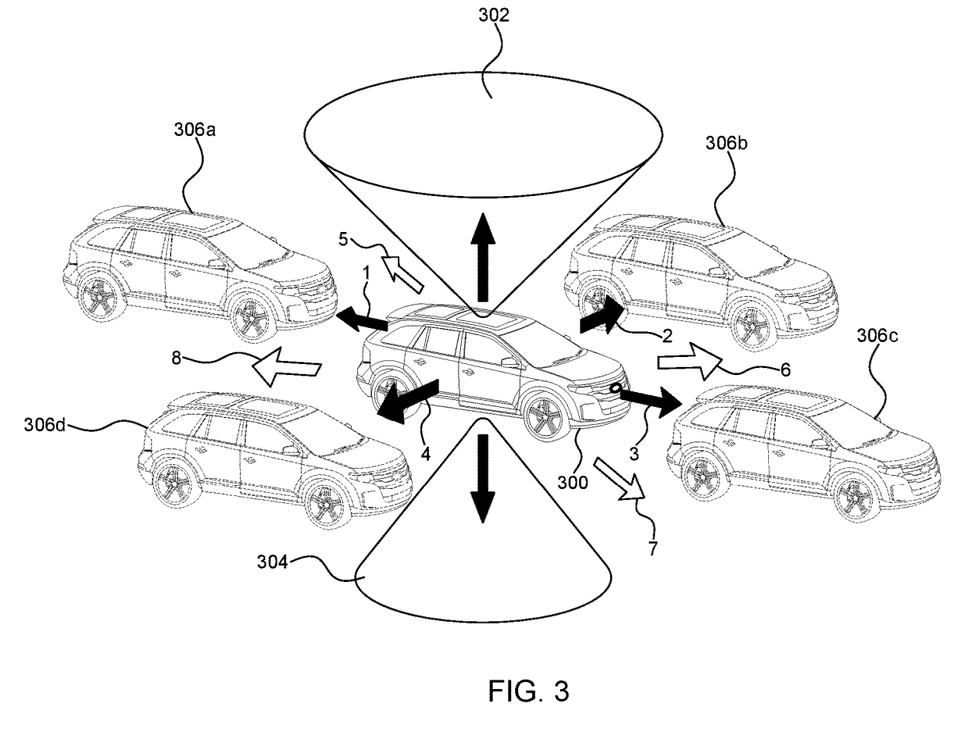
FIG. 3 depicts an example embodiment to project holograms outside a vehicle in accordance with the present disclosure.

FIG. 3 depicts an example embodiment to project holograms outside a vehicle 300 in accordance with the present disclosure. The vehicle 300 may be same as the vehicle 205. The vehicle 300 may include the 360-degree exterior IHCM 220 and the plurality of IHCMs 225. The 360-degree exterior IHCM 220 may be disposed on a vehicle top surface and/or a vehicle bottom surface. Thus, the 360-degree exterior IHCM 220 may be configured to project a hologram (e.g., the hologram 110) at a vehicle top portion 302 or a vehicle bottom portion 304. The 360-degree exterior IHCM 220 may project a static hologram or may project a movable hologram that may move 360 degrees around the vehicle top portion 302 and/or the vehicle bottom portion 304.

The plurality of IHCMs 225 may be disposed in vehicle exterior and/or vehicle interior portions. The plurality of IHCMs 225 may include the first set of exterior IHCMs and the second set of interior IHCMs, as described above in conjunction with FIGS. 1 and 2. The first set of exterior IHCMs may be disposed on vehicle exterior portions. For example, the first set of exterior IHCMs may be disposed on four vehicle side surfaces to project the hologram 110 in vehicle front, rear, left and/or right portions (shown by arrows 1-4). In addition, the first set of exterior IHCMs may be configured to project the hologram 110 in vehicle four corners (shown by arrows 5-8). For example, the first set of exterior IHCMs may project a vehicle 300 hologram (shown as holograms 306a, 306b, 306c, and 306d in FIG. 3). The vehicle 300 hologram may be static or movable.

In some aspects, the vehicle processor 230 and/or the server 210 may be configured to perform one or more actions associated with the holograms 306a-d based on user 115 inputs, as described in conjunction with FIG. 2. For example, the vehicle processor 230 and/or the server 210 may transform hologram exterior color, style, designs, etc. In further aspects, the vehicle processor 230 and/or the server 210 may transform the holograms 360a-d to other objects (e.g., aircrafts, spacecraft, other vehicle models, etc.).

The second set of interior IHCMs may be configured to project holograms (not shown) inside the vehicle 300. For example, the second set of interior IHCMs may be configured to create new vehicle interior themes for vehicle passengers, e.g., a race car theme, an underwater submarine theme, fighter jet cabin theme, alien spaceship theme, etc. In some aspects, the second set of interior IHCMs may be used to project holograms for billboards, advertisement, etc., as described in conjunction with FIG. 5.

Figure 4:
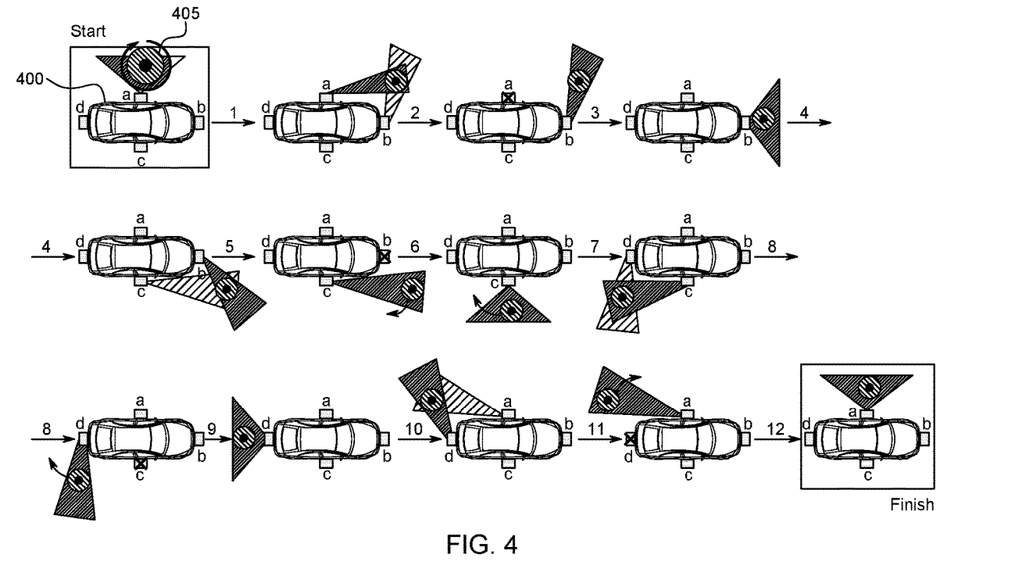
FIG. 4 depicts another example embodiment to project moving holograms outside a vehicle in accordance with the present disclosure.

FIG. 4 depicts another example embodiment to project moving holograms outside a vehicle 400 in accordance with the present disclosure. The vehicle 400 may be same as the vehicle 105, 205 or 300. The vehicle 400 may include interior and/or exterior IHCMs (same as the plurality of IHCMs 225, described above). For instance, the vehicle 400 may include four IHCMs a-d that may be located on vehicle front, vehicle rear, vehicle left and vehicle right sides. The IHCMs a-d may project a hologram 405 of an object outside the vehicle 400, and may move the hologram 405 around the vehicle 400 in a flawless manner without visible interruption. Further, as mentioned above, each IHCM may be configured to rotate and is thus configured to project the movable hologram 405 around the vehicle 400.

In some aspects, FIG. 4 depicts an exemplary process (steps 1-12) of projecting the moving hologram 405 in a clockwise direction around the vehicle 400. When the process starts, the IHCMa (located on a vehicle 400 left side) may project the hologram 405 on the vehicle 400 left side at a start position. At step 1, the IHCMa may rotate the hologram 405 until the hologram 405 reaches a corner position. In this step, a video camera associated with the IHCMb may capture first images/videos of the hologram 405 and transmit the first images/videos to the vehicle processor 230. Responsive to receiving the first images/videos, the vehicle processor 230 may determine whether the hologram 405 has entered IHCMb projection range (completely or partially). The vehicle processor 230 may then determine whether the hologram 405 is within the IHCMa projection range or outside.

Specifically, the vehicle processor 230 may obtain second images/videos from a video camera associated with IHCMa. The vehicle processor 230 may then compare the first images/videos with the second images/videos, and determine whether the hologram 405 is within the IHCMa projection range or the IHCMb projection range based on the comparison. For example, the vehicle processor 230 may determine that the hologram 405 is within the IHCMb projection range when a first hologram projection quality associated with the first images/videos is greater than a second hologram projection quality associated with the second images/videos.

In additional aspects, the IHCMa may send hologram 405 recording, as glTF file, to the vehicle processor 230. The vehicle processor 230 may analyze the recording (glTF file) and track hologram 405 movement to determine an estimated hologram movement direction and speed. Responsive to determining the estimated hologram movement direction, the vehicle processor 230 may compare the first images/videos from the IHCMb video camera with an estimated hologram 405 position after a predefined time duration (determined based on the estimated hologram movement direction and speed). The vehicle processor 230 may determine that the hologram 405 may have entered the IHCMb projection range (and hence exit the IHCMa projection range) when a match between the first images/videos and the estimated hologram 405 position is higher than a predefined threshold. For example, if the actual hologram 405 position (as obtained from the first images/videos) matches with the estimated hologram 405 position, the vehicle processor 230 may determine that the hologram 230 has entered the IHCMb projection range.

Responsive to the determination described above, the vehicle processor 230 may switch the hologram 405 projection from the IHCMa to the IHCMb. Stated another way, the IHCMa may pass hologram 405 projection to the IHCM 2.

In some aspects, at step 2, the vehicle processor 230 may decide whether complete or partial hologram 405 projection may be passed from the IHCMa to the IHCMb. In particular, the vehicle processor 230 may determine whether complete or partial hologram 405 projection may be passed from the IHCMa to the IHCMb, based on the first hologram projection quality, the second hologram projection quality or the comparison between the estimated hologram 405 position and the actual hologram 405 position. Responsive to a determination that the hologram 405 may have moved completely from the IHCMa range and into the IHCMb range, the vehicle processor 230 may switch the hologram 405 projection from the IHCMa to the IHCMb. In some aspects, a switching time associated with switching the projection from the IHCMa to the IHCMb may be less than 80 microseconds, and thus a viewer may not see any visible interruption or deviation in the hologram 405 projection/movement.

At step 3, the IHCMb may project the hologram 405 completely and start moving the hologram 405 until it reach another corner position. At this position, the vehicle processor 230 may pass the hologram 405 projection from the IHCMb to the IHCMc, in a manner described above. Similarly, the vehicle processor 230 may pass the hologram 405 projection from the IHCMc to the IHCMd, and then finally to the IHCMa (e.g., when the hologram 405 again enters the IHCMa projection range), completing steps 1-12 shown in FIG. 4.

The vehicle processor 230 and the IHCMs a-d may perform the process described above (i.e., the steps 1-12) iteratively, till the vehicle operator (e.g., the user 115) sends a request to the vehicle processor 230 to stop the hologram 405 projection or the hologram 405 movement.

In some aspects, the vehicle processor 230 may be configured to predict direction of the hologram 405 movement (as described above) based on the glTF files received from respective IHCMs a-d (i.e., based on geometry and flattened hierarchy data obtained from the received glTF file). In further aspects, the vehicle processor 230 may be configured to generate holographic data stream from the glTF files that may include information for each IHCM a-d (e.g., hologram 405 coordinates, direction, angle, focal length, timing settings, etc.). The vehicle processor 230 may send the generated holographic data stream to each IHCM a-d at a predefined frequency, which may enable each IHCM a-d to adjust IHCM parameters to efficiently project the hologram 405. For example, each IHCM a-d may adjust focal length based on the holographic data stream, to project the hologram 405 clearly without any visible distortion.

A person ordinarily skilled in the art may appreciate that the vehicle 400 may require at least four IHCMs to project a moving hologram (e.g., the hologram 405). For projecting holograms of multiple moving objects, the vehicle 400 may require additional IHCMs. For example, the vehicle 400 may require six IHCMs for projecting moving holograms of two objects. In addition, multiple holographic moving objects that are located very close to each other may be deployed/projected from the same IHCM. In some aspects, such holographic objects may be treated as one moving holographic object with several elements which can move independently.

In further aspects, the holographic projections/holograms described above may be interactive to provide a level of realism to the vehicle operator or the user 115. The vehicle processor 230 may be configured to determine when the user 115 touches the hologram 405, and may perform predetermined action(s) based on the determination. As an example, the vehicle processor 230 may cause the vehicle speakers to output an audible signal (e.g., a dog bark) when the vehicle processor 230 determines that the user 115 has touched the hologram 110 shown in FIG. 1. In some aspects, the vehicle processor 230 may imitate the spatial sound of dog bark by using several high-quality speakers placed in various vehicle locations (e.g., vehicle interior speakers, waterproof exterior speakers, along with IHCM speakers). The vehicle processor 230 may use all vehicle speakers simultaneously to enhance the sound quality.

Figure 5:
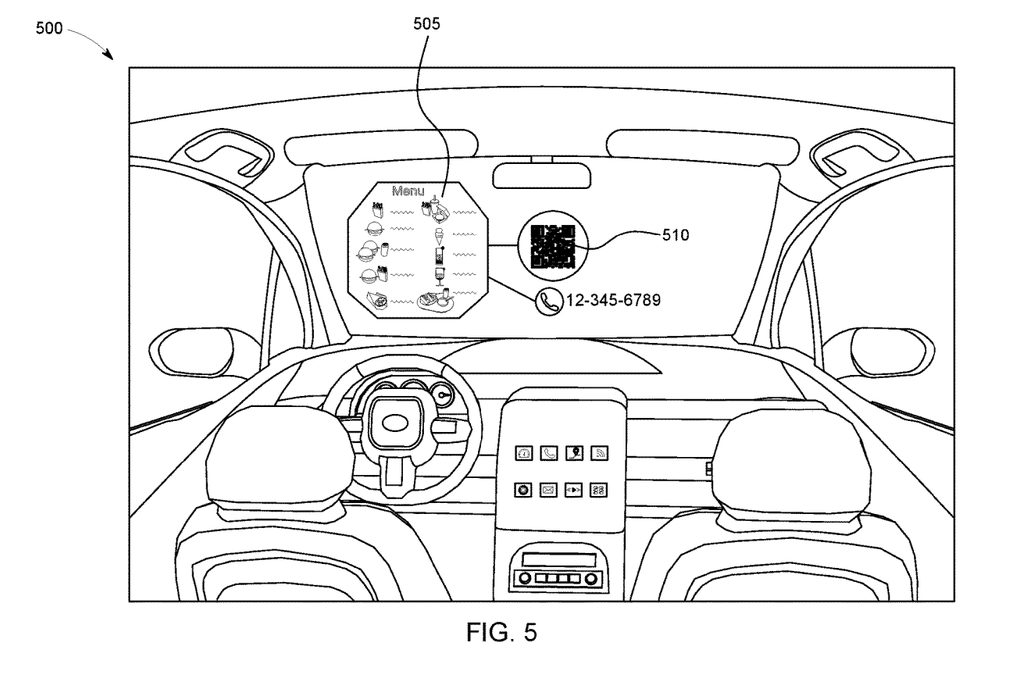
FIG. 5 depicts an example embodiment to project holographic menu in accordance with the present disclosure.

FIG. 5 depicts an example embodiment to project holographic menu in accordance with the present disclosure. In particular, FIG. 5 depicts a vehicle 500 that may be same as the vehicle 105, 205, 300, or 400. The vehicle 500 may include the first set of exterior IHCMs and the second set of interior IHCMs. The second set of interior IHCMs may be configured to project a hologram of an object on the vehicle interior portion.

In some aspects, the second set of interior IHCMs may be configured to read content (including text) or a hologram that a third-party projector project onto a vehicle exterior glass panel. The third-party may be a restaurant that may provide drive-thru facility. The third-party may project a food menu hologram 505 on the vehicle exterior glass panel by using the third-party projector, while the user 115 is waiting in queue. The user 115 may then select an order from the projected hologram 505. In particular, the user 115 may scroll the menu displayed on the vehicle glass panel, and may select the order by touching one or more icons on the projected hologram 505.

In some aspects, the second set of interior IHCMs may transmit hologram 505 recording to the vehicle processor 230, and the vehicle processor 230 may be configured to identify the selected order by determining the user touch on the projected hologram 505, as described above. In additional aspects, the user may select the order or add additional instructions for the food item(s) via voice commands. In this case, the vehicle processor 230 may be configured to interact with the user 115, e.g., via a voice assistant. The vehicle processor 230 may be configured to convert the user 115 voice commands into text, and cause the second set of interior IHCMs to project the text onto vehicle glass panel (e.g., onto a polyester screen blind or on a modified vehicle glass panel based on ambient lighting conditions). The third-party projector may be configured to read the projected text and process the order based on the text.

Further, the third-party projector may be configured to generate a Quick response (QR)/Bar code 510 for payment, and may project the QR/Bar code 510 on the vehicle glass panel. The QR/Bar code 510 may include online bill information to be paid.

The second set of interior IHCMs may use the video camera 270 or vehicle interior camera(s) to capture the QR/Bar code 510 image, and may transmit the captured image to the server 210 (or any other server) for authorization and/or for payment verification with external trusted/registered organizations.

The user 115 may make the payment by using different methods. For example, the server 210 may have a user 115 payment account that may be synchronized by the third-party, and the user 115 may use the user 115 payment account for making the payment. The user 115 may authenticate the transaction before making the payment. The user 115 may authenticate the transaction via voice commands/recognition, or via facial/fingerprint recognition, or by using a card reader. In further aspects, the user 115 may use other vehicle internal cameras or scan devices (such as RFID, NFS, fingerprint reader) to authenticate transaction. In further aspects, the vehicle processor 230 may be configured to generate a QR code that may be scanned by the user 115 (by using the user device) to recharge the user 115 account on the server 210. In this case, the vehicle processor 230 may project (via the second set of interior IHCMs) the generated QR code on the vehicle glass panel so that the user 115 may easily scan the QR code and recharge the user 115 account.

Figure 6:
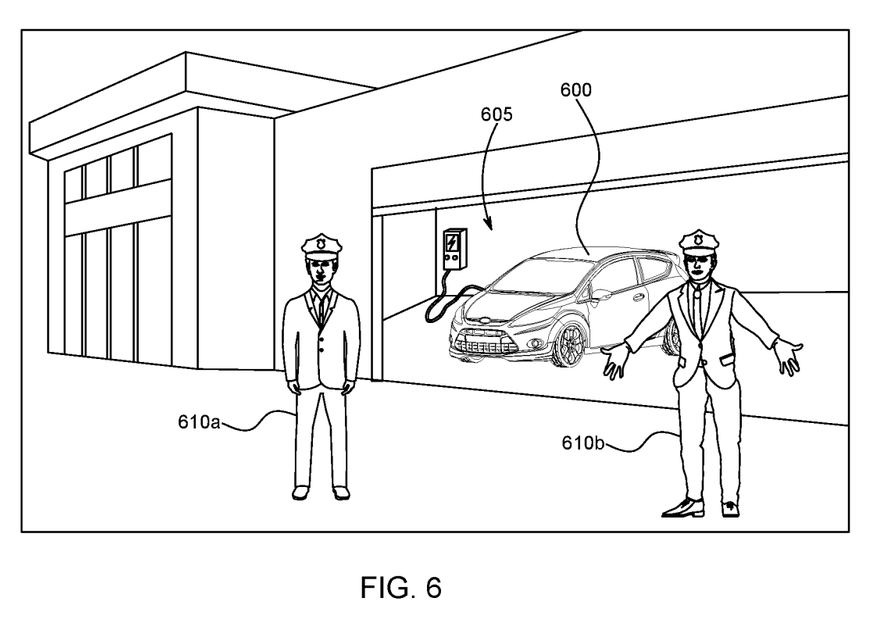
FIG. 6 depicts an example embodiment to project security holograms in accordance with the present disclosure.

FIG. 6 depicts an example embodiment to project security holograms in accordance with the present disclosure. In particular, FIG. 6 depicts a vehicle 600 that may be same as the vehicle 105, 205, 300, 400 or 500. The vehicle 600 may be parked at a user home, e.g., near an Electric Vehicle (EV) charging station 605. The vehicle 600 may include the plurality of IHCMs (e.g., the plurality of IHCMs 225) that may be configured to project holograms to assist in maintaining home or vehicle security. For example, the plurality of IHCMs may be configured to project home security themes such as holograms of police officers 610a, 610b (collective referred to as police officers 610), security guards, military soldiers and robots, which may be pre-stored on the server 210 and/or the vehicle memory. In some aspects, each theme may include at least two different animate holograms/holographic objects. The vehicle processor 230 may be configured to animate the different holographic objects such that the objects may be interactive to provide a level of realism, and thus provide a secure environment for the vehicle 600 (and the user home).

The vehicle 600 may be configured to monitor vehicle surroundings using different vehicle 600 components. For example, the vehicle 600 components may include vehicle motion sensors, vehicle cameras (including exterior and interior cameras), sound detectors, microphones, etc. The vehicle 600 may be further configured to receive inputs/notification from smart home devices to monitor vehicle/home surroundings. The smart home devices may include, for example, home security cameras, home alarm, motion detectors, other sensors/detectors (such as water, window, door, light, heat, smoke, carbon monoxide (CO) detectors, etc.). In some aspects, the vehicle 600 may be configured to receive media and holographic content from the smart home devices. In further aspects, the vehicle processor 230 may transmit the holographic projections or hologram recordings from the vehicle 600 to the smart home devices. In addition, the vehicle processor 230 may synchronize and control vehicle 600 components and the smart home devices.

In an exemplary aspect, the plurality of IHCMs 225 may project two police officer holograms 610 (and/or other holographic objects in the theme) in vehicle 600 front during nighttime. The vehicle processor 230 may further control projection duration based on vehicle component parameters, so that the vehicle processor 230 may preserve vehicle battery. The vehicle component parameters may include, but are not limited to, vehicle battery parameters (status, voltage, State of charge (SoC), battery state, etc.).

The vehicle processor 230 may further receive the hologram 610 recording from the plurality of IHCMs 225 at a predefined frequency as described above. The holograms 610 may be movable holograms, so that a viewer may perceive the holograms 610 as real police officers. The vehicle processor 230 may be further configured to detect a user touch with the holograms 610. For example, the vehicle processor 230 may detect when a user tries to pass through the holograms 610. Responsive to detecting the user touch, the vehicle processor 230 may perform one or more of transmitting a notification (including calling or messaging) to real police officers or home owner/vehicle owner to indicate a potential adverse situation, activating home security system, raising an alarm/siren (via vehicle speaker or home siren), and/or the like.

In further aspects, the vehicle processor 230 may activate the vehicle cameras to capture hologram 610 images/videos, when the user touches or crosses the holograms 610.

In some aspects, the vehicle processor 230 may further cause projections (via the plurality of IHCMs 225) of other hologram objects into the home or any other location. In further aspects, the vehicle processor 230 may receive requests from one or more smart home devices (such as a voice assistant) to determine a current vehicle security status. Responsive to receiving the request, the vehicle processor 230 may send the vehicle security status to the smart home device. For example, the vehicle processor 230 may indicate whether any user has tried to touch the holograms 610. In addition, the vehicle processor 230 may project or send a short 3D holographic projection video to report the current vehicle security status. For instance, when everything is stable and no issues are there (e.g., when no one has tried to touch the holograms 610), the vehicle processor 230 may project police officers that may wave at the vehicle/home owner along with "Thumb-Up" gesture. In another scenario, when the vehicle processor 230 detects the user touch, the vehicle processor 230 may project a holographic video of police officers that are patrolling in a reported location with an expression of curiosity on their faces and ready to take an action.

In some aspects, the vehicle processor 230 may be configured to project the short 3D holographic projection video as described above or any other projection video outside the vehicle 600, when the vehicle 600 is parked. In an exemplary aspect, the vehicle processor 230 may project a 3D holographic projection video (with spatial audio) that may be associated with vehicle diagnostic/problem information, and may describe the vehicle problem visually. For example, the 3D holographic projection video may be associated with a vehicle flat tire or a low vehicle state of charging (SOC). In some aspects, the vehicle processor 230 may project multiple short 3D holographic projection videos, one after the other, if the vehicle processor 230 determines multiple issues or vehicle problems.

The vehicle processor 230 may be further configured to store the above-mentioned videos (completely or partially) in the vehicle memory. The vehicle processor 230 may further send the videos to the server 210 for storage purposes. In further aspects, the vehicle processor 230 may obtain the stored videos from the server 210, and may add supplemental information to the videos before projecting the videos outside the vehicle 600. For example, if the video is for vehicle flat tire, the vehicle processor 230 may supplement the video with exact location associated with the flat tire and a current tire pressure.

The vehicle processor 230 may further access the server 210, based on vehicle user request, to download and project holographic videos/tutorials related to different topics, e.g., vehicle repair if the vehicle processor 230 detects vehicle problems.

In additional aspects, the vehicle processor 230 may project holograms 610 on virtual 2D or 3D screens, televisions or monitors inside or outside the vehicle 600 with configurable dimensions, and/or the like. In particular, the vehicle processor 230 may display media content from, but not limited to, vehicle exterior and interior video cameras (live streaming), vehicle memory, external storage devices that may be plugged into vehicle's internal universal serial bus (USB) ports, the server 210, home security cameras, or third-party servers. In some aspects, the vehicle processor 230 may adjust video image quality parameters, such as resolution and frames per second (FPS) based on available network bandwidth, before projecting the videos/images as holograms. In further aspects, the vehicle user may configure hologram display parameters in vehicle settings or an application (associated with the server 210), and may increase the image quality.

In yet another aspect, the vehicle processor 230 may be configured to project holograms of vehicle passengers outside the vehicle 600, or project holograms of users outside the vehicle 600 inside the vehicle 600. Specifically, the vehicle processor 230 may command the interior IHCMs to capture video and audio (by using IHCM camera and microphone) of vehicle passengers who may be sitting inside the vehicle 600, and project their holograms outside the vehicle 600 by using external IHCMs' projectors. Similarly, the vehicle processor 230 may command the external IHCMs to capture video and audio of users who may be located outside the vehicle 600, and project their small or miniature holograms inside the vehicle 600 by using internal IHCMs' projectors. In other aspects, the vehicle processor 230 may transmit the hologram recordings to third-party projectors, smart home projector device, etc., to live stream the hologram projection (e.g., for enabling holographic video call). The vehicle processor 230 may also augment the hologram projection with text or additional messages, while transmitting the hologram recording to third-party projectors, smart home projector device, etc.

Figure 7:
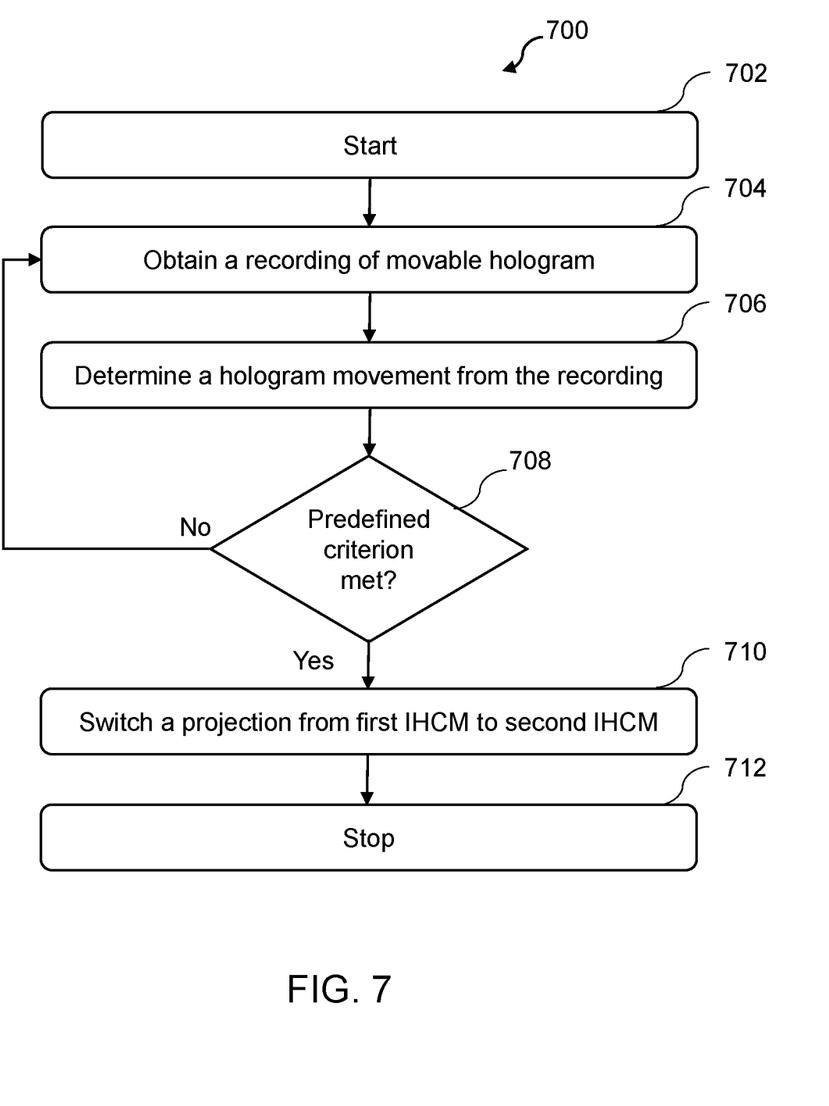
FIG. 7 depicts a flow diagram of an example method for projecting holograms, in accordance with the present disclosure.

FIG. 7 depicts a flow diagram of an example method 700 for projecting holograms, in accordance with the present disclosure. FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

The method 700 may commence at step 702. At step 704, the method 700 may include obtaining, by the vehicle processor 230, a recording of a movable hologram (e.g., the hologram 110). In particular, the vehicle processor 230 may receive the hologram 110 recording from a first IHCM of the plurality of IHCMs 225.

At step 706, the method 700 may include determining, by the vehicle processor 230, the hologram 110 movement based on the hologram 110 recording. For example, the vehicle processor 230 may determine whether the hologram 110 is within a first IHCM projection range at the step 706.

At step 708, the method 700 may include determining, by the vehicle processor 230, whether a predefined criterion is met. In some aspects, the vehicle processor 230 may determine that the predefined criterion is met when the hologram 110 moves from the first IHCM projection range to a second IHCM projection range.

At step 710, the method 700 may include switching, by the vehicle processor 230, a hologram 110 projection from the first IHCM to a second IHCM when the predefined criterion is met. Alternatively, the vehicle processor 230 may not switch the hologram 110 projection from the first IHCM, if the vehicle processor 230 determines that the predefined criterion is not met at step 708.

At step 712, the method 700 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a plurality of Integrated Holographic Camera Modules (IHCMs) configured to project movable holograms;
    a vehicle processor communicatively coupled to the plurality of IHCMs, wherein the vehicle processor is configured to:
        obtain a recording of a movable hologram from a first IHCM;
        determine a hologram movement from the recording; and
        switch a projection of the movable hologram from the first IHCM to a second IHCM when a predefined criterion is met,
    wherein the plurality of IHCMs comprises a first set of exterior IHCMs and a second set of interior IHCMs,
    wherein the second set of interior IHCMs is configured to project an interior hologram and the first set of exterior IHCMs is configured to project an exterior hologram, and
    wherein the vehicle processor is further configured to merge the interior hologram and the exterior hologram to project a unified hologram.

2. The vehicle of claim 1, wherein the predefined criterion is met when the projection moves from a first IHCM projection range to a second IHCM projection range.

3. The vehicle of claim 1, wherein each IHCM comprises a holographic projector, a holographic recorder, and a video camera.

4. The vehicle of claim 1, wherein each IHCM is configured to rotate to project the movable hologram.

5. The vehicle of claim 1, wherein the first set of exterior IHCMs comprises the first IHCM and the second IHCM.

6. The vehicle of claim 1, wherein the second set of interior IHCMs is configured to:
    capture a first hologram projected by a third-party exterior projector; and
    transmit a first hologram recording to the vehicle processor,
    wherein the vehicle processor is configured to determine a user interaction associated with the first hologram and perform an action based on the user interaction.

7. The vehicle of claim 1, wherein the vehicle processor is further configured to determine a user interaction associated with the movable hologram and perform an action based on the user interaction.

8. A method to project a movable hologram, the method comprising:
    obtaining, by a vehicle processor, a recording of the movable hologram from a first Integrated Holographic Camera Module (IHCM) of a plurality of IHCMs, wherein the plurality of IHCMs is configured to project movable holograms;
    determining, by the vehicle processor, a hologram movement from the recording;
    switching, by the vehicle processor, a projection of the movable hologram from the first IHCM to a second IHCM when a predefined criterion is met;
    determining a user interaction associated with the movable hologram and perform an action based on the user interaction;
    wherein the plurality of IHCMs comprises a first set of exterior IHCMs and a second set of interior IHCMs,
    wherein the second set of interior IHCMs is configured to project an interior hologram and the first set of exterior IHCMs is configured to project an exterior hologram, and
    wherein the vehicle processor is further comprising merging the interior hologram and the exterior hologram to project a unified hologram.

9. The method of claim 8, wherein the predefined criterion is met when the projection moves from a first IHCM projection range to a second IHCM projection range.

10. The method of claim 8, wherein each IHCM comprises a holographic projector, a holographic recorder, and a video camera.

11. The method of claim 8, wherein each IHCM is configured to rotate to project the movable hologram.

12. The method of claim 8, wherein the first set of exterior IHCMs comprises the first IHCM and the second IHCM.

13. A vehicle comprising:
    a plurality of Integrated Holographic Camera Modules (IHCMs) configured to project movable holograms;
    a vehicle processor communicatively coupled to the plurality of IHCMs, wherein the vehicle processor is configured to:
        obtain a recording of a movable hologram from a first IHCM;
        determine a hologram movement from the recording; and
        switch a projection of the movable hologram from the first IHCM to a second IHCM when a predefined criterion is met,
    wherein the plurality of IHCMs comprises a first set of exterior IHCMs and a second set of interior IHCMs, and
    wherein the second set of interior IHCMs is configured to:
        capture a first hologram projected by a third-party exterior projector; and
        transmit a first hologram recording to the vehicle processor,
        wherein the vehicle processor is configured to determine a user interaction associated with the first hologram and perform an action based on the user interaction.

* * * * *